Sept. 24, 1968  H. H. HOENICK  3,402,791
AUTOMATIC ADJUSTERS FOR VEHICLE BRAKES
Filed March 15, 1967  2 Sheets-Sheet 1

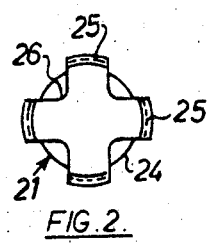
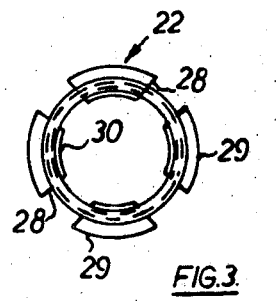
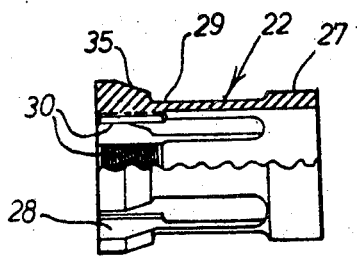
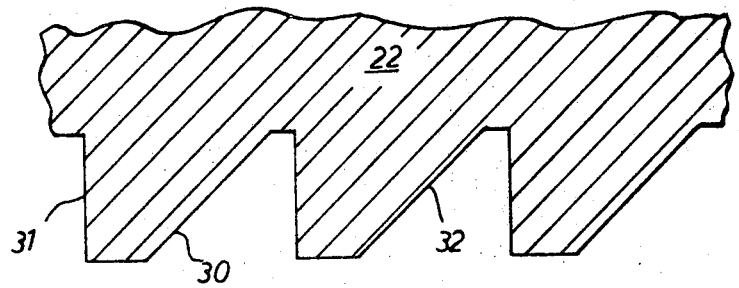

United States Patent Office 3,402,791
Patented Sept. 24, 1968

3,402,791
AUTOMATIC ADJUSTERS FOR VEHICLE BRAKES
Hermann H. Hoenick, Immendorf, Germany, assignor to Girling Limited, Birmingham, England
Filed Mar. 15, 1967, Ser. No. 623,329
Claims priority, application Great Britain, May 5, 1966, 19,819/66
10 Claims. (Cl. 188—106)

ABSTRACT OF THE DISCLOSURE

An automatic adjuster for a hydraulic brake actuator comprises a linear ratchet mechanism operative between a piston of the actuator and a cam (auxiliary mechanical actuator) journalled in a second piston opposed to the first-mentioned piston or in a cylinder body in which the piston is slidable. A thrust member biased by a spring against the cam is slidingly sealed to a bore in the piston and has an abutment for engaging the pawls of the ratchet mechanism to step the mechanism when excessive travel takes place between the piston and the second piston opposed thereto or the cylinder body. This thrust member is acted upon by the brake fluid pressure and the spring is overcome when this pressure exceeds a comparatively low value at which the brake clearances have been taken up but the brake pads are not applied with substantial force. When the spring is overcome further adjustment cannot take place.

---

Figure 1:
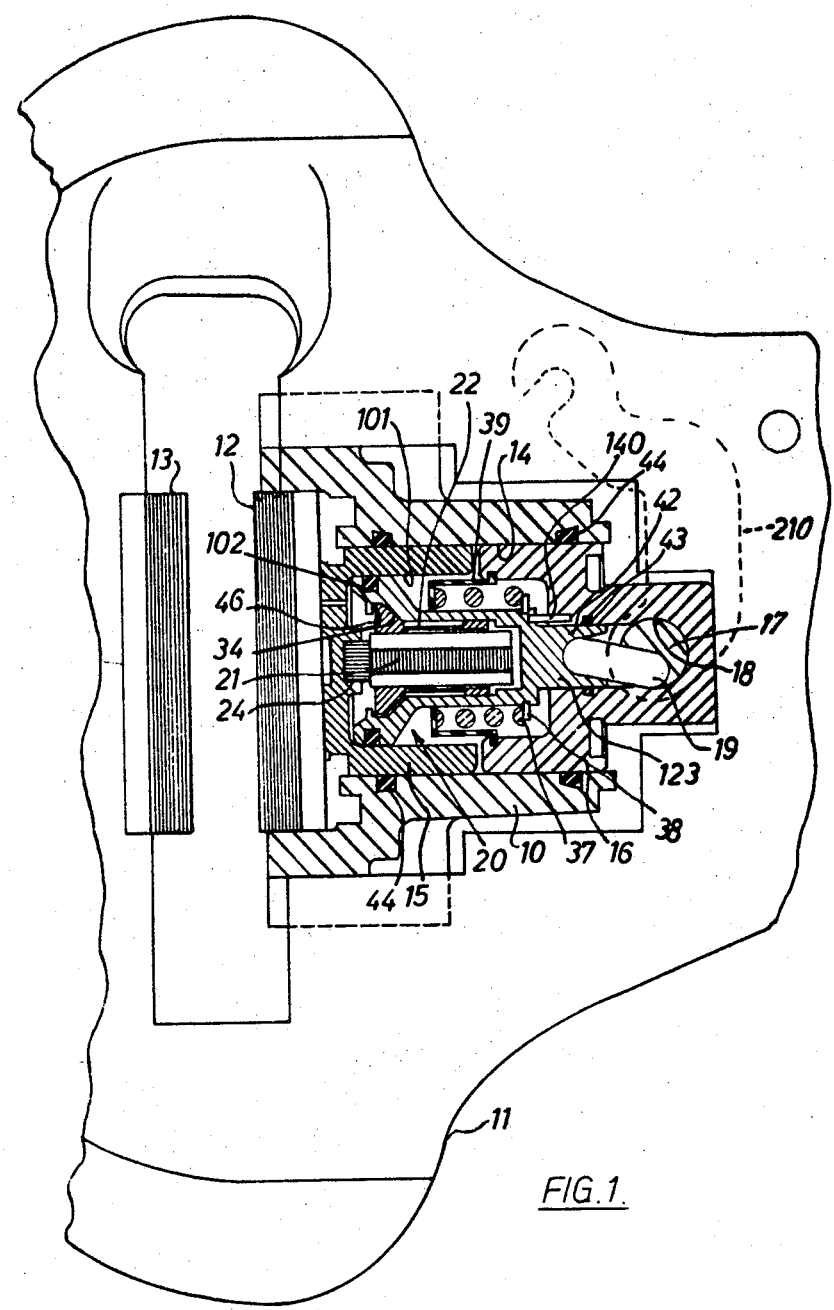

The present invention relates to an adjuster for a hydraulic actuator for a vehicle brake, such as a spot-type disc brake, the hydraulic actuator including a piston and a counter-member (such as a cylinder or a second piston) opposed to the first mentioned piston, an auxiliary mechanical actuator (such as a hand brake) being fitted in the counter-member. When pressure is applied to the hydraulic actuator, the hydraulic fluid urges the piston and the counter-member apart to apply the brake.

An object of the invention is to provide means to prevent the piston and its counter-member moving too far towards one another when the brake pressure is released as otherwise excessive pedal travel would be required next time the brake is applied.

Another object of the invention is to provide an adjustable length mechanism between the piston and the auxiliary mechanical actuator, the adjustable length mechanism being capable of withstanding the full brake applying thrust which can be achieved by the mechanical actuator.

A further object of the invention is to provide an adjustable length mechanism which is automatically adjustable when brake pad wear has taken place.

Accordingly, the present invention provides an automatic adjuster which is operative between a hydraulic actuator piston and a counter-member opposed thereto and which comprises a linear ratchet mechanism which includes a row of ratchet teeth and a pawl engageable with said teeth, a stepping member sealingly slidble relative to said piston and exposed to said working chamber, spring means acting on said stepping member in a direction opposite to the force applied thereto by fluid pressure in said working chamber, and abutment means on said stepping member for stepping said ratchet mechanism to increase its length responsively to relative travel between said piston and said auxiliary mechanical actuator in excess of a predetermined relative travel so long as the fluid pressure in said working chamber is insufficient to overcome said spring.

The invention is further described, by way of example, with reference to the accompanying drawings in which:

FIG. 1 is a sectional plan view of an automatic adjuster constructed in accordance with the invention for a hydraulic actuator of a disc brake, FIG. 2 is an end view of one component of a mechanism of adjustable length of the actuator of FIG. 1, FIG. 3 is a similar view of another component of the mechanism of adjustable length, FIG. 4 is a partly sectioned side view of the component of FIG. 3, and FIG. 5 is a very much enlarged sectional detail of the component of FIGS. 3 and 4.

Referring now to FIG. 1 of the drawings, a spot-type disc brake comprises a fixed body member 10 on which a yoke 11 is slidably mounted for movement transversely to the disc (not shown). Brake pads 12 and 13 are arranged to engage opposite sides of the disc. The body member has a through bore 14 in which opposed pistons 15 and 16 are slidable. The directly operated pad 12 is supported on and actuated by the piston 15 which, incidentally, is prevented by this pad from turning. The piston 16 engages and acts upon the yoke 11 and is prevented by the yoke from turning. The indirectly operated pad 13 is supported by the yoke.

An auxiliary mechanical actuator (e.g. a hand brake or other form of brake normally used for parking or emergencies) comprises a cam 17 journalled in a transverse bore 18 in the piston 16. The cam 17 acts on the piston 15 through an adjustable length ratchet mechanism 20 and a dolly 19. A lever 210 is attached to the cam 17 for turning this cam and an adjustable stop (not shown) is provided to determine the normal resting position of the cam 17.

The ratchet mechanism 20 comprises a pair of ratchet components 21 and 22 and a thrust member 123, a shank 42 of which is engaged by the dolly 19. The ratchet component 21 has a knurled head 24 which is force-fitted in the base of the hollow piston 15. The component 21 is shown to a larger scale in FIG. 2 and comprises a rod which has rows of ratchet teeth 25 over the major part of its periphery. The ratchet teeth are constituted by circumferentially extending serrations which are interrupted by longitudinal flutes 26 in the component 21. The component 22 which is shown in more detail in FIGS. 3 and 4 comprises a sleeve 27 formed with longitudinal slits 28 for most of its length to define four springy fingers 29. The free or distal ends of the fingers 29 are formed with serrations 30 complementary to the serrations 25 on the component 21. The fingers 29 thereby act as pawls biased by their inherent resilience into engagement with the corresponding teeth 25 on the component 21. The form of the serrations 30 is shown in the very much enlarged detail of FIG. 5. As can be seen from this figure, the serrations have the form of a buttress thread on which the perpendicular flanks 31 serve to transmit thrust to a corresponding flank on the serrations on component 21. The opposed inclined flanks 32 allow the serrations to ride over one another when the mechanism is stepped to accomplish adjustment. Conveniently the serrations are formed in a fine-pitch spiral in the manner of a fine-pitch screw thread to facilitate manufacture although there is in fact no screwing action in the adjuster of the present invention. Alternatively the serrations can be annular. The thrust member 123 is hollow and serves to house the ratchet component 22 as shown in FIG. 1. The thrust member 123 has an internal conical surface 34 which normally engages a complementary conical surface 35 (FIG. 4) adjacent the free ends of the fingers 29 of the component 22. Thus when the thrust member 123 applies a thrust through the ratchet teeth to the piston 15 this thrust is transmitted at these conical surfaces and the reaction at these surfaces has an inward force component acting on the fingers to urge these fingers more firmly and positively into engagement with the serrations on the component 21 so that the possibility of slipping of the ratchet mechanism is effectively avoided.

The thrust member 123 has an internal flange at its end remote from the cam 17 forming an abutment 46 for the component 22 and a predetermined clearance is normally present between this abutment and the component 22. A compression spring 37 acts between a spring ring 38 on the thrust member 123 and a cup member 39, sprung into a groove in the piston 16, to urge the member 123 against the cam 17 which is thereby held normally against the previously mentioned adjustable stop. A dowel 140 fitted between the piston 16 and the member 123 prevents this member from turning. The shank 42 of the member 123 is sealed to a bore in the piston 16 by a sealing ring 43. The pistons 15 and 16 are sealed to the bore 14 by sealing rings 44. A sealing ring 102 seals the thrust member 123 to the blind bore 101 in the piston 15.

The ratchet mechanism 20 acts as a strut which limits the movement of the pistons 15 and 16 towards one another when the brake is in its release position. When the brake is applied by supplying brake fluid under pressure to the space between the pistons 15 and 16, these pistons are urged apart to apply the pads 12 and 13 to the disc. The relationship between the diameter of the bore 101 to which the thrust member 123 is sealed and the force of the spring 37 is such that this spring is overcome and the member 123 is moved to the left by the hydraulic pressure when a predetermined pressure is reached. This pressure is such that all the brake clearances are taken up but the pads 12 and 13 are not applied to the disc with substantial force. Normally the relative travel which takes place between the pistons 15 and 16 before the predetermined pressure is reached is less than the sum of the clearance between the component 22 and the abutment 46 and the pitch of the ratchet teeth so that no adjustment takes place. If there should be excessive relative travel between the pistons due to pad wear, the component 21 is moved so far to the left relative to the component 22 that the ratchet mechanism is stepped to achieve automatic adjustment, i.e., the strut formed by the ratchet mechanism is slightly increased in length so that the pistons will not move so far towards one another when the brake pressure is released. Once the predetermined pressure is exceeded, this pressure urges the thrust member 123 to the left against the ratchet component 22 and no further adjustment can take place. This ensures that distortion of the brake (e.g. yoke deflection) which may take place upon heavy application of the brake will not cause overadjustment.

When the auxiliary brake is applied, a brake-applying thrust is transmitted between the pistons through the ratchet mechanism by the cam 17. This causes the serrations 30 on fingers 29 to be urged positively against the serrations 25 on the rod 21 as previously described.

When it is desired to reset the adjuster upon replacement of worn pads by new pads, the piston 15 can be turned through 45° to disengage the serrations 25 on the rod 21 from the serrations 30 on the component 22. The piston 15 can then be pushed inwards to reduce the length of the ratchet mechanism to a minimum before a new pad 12 is fitted.

I claim:

1. In a hydraulic actuator for a vehicle brake including a piston, a counter-member opposed to said piston, a working chamber between said piston and said counter-member for receiving brake fluid under pressure to move said piston and counter-member apart when the brake is applied hydraulically and an auxiliary mechanical actuator fitted in said counter-member for mechanically moving said piston and counter-member apart: an automatic adjuster operative between said piston and said auxiliary mechanical actuator and comprising a linear ratchet mechanism which includes a row of ratchet teeth and a pawl engageable with said teeth, a stepping member sealingly slidable relative to said piston and exposed to said working chamber, spring means acting on said stepping member in a direction opposite to the force applied thereto by fluid pressure in said working chamber and abutment means on said stepping member for stepping said ratchet mechanism to increase its length responsively to relative travel between said piston and said auxiliary mechanical actuator in excess of a predetermined relative travel so long as the fluid pressure in said working chamber is insufficient to overcome said spring.

2. An automatic adjuster as claimed in claim 1 in which said auxiliary mechanical actuator comprises a cam journalled in said counter-member.

3. An automatic adjuster as claimed in claim 2 in which said cam is journalled about an axis perpendicular to the longitudinal axis of said hydraulic actuator.

4. An automatic adjuster as claimed in claim 1 in which said stepping member comprises a thrust member having a surface thereon, said thrust member normally engaging said pawl in the thrust direction through said surface.

5. An automatic adjuster as claimed in claim 4 in which said ratchet mechanism comprises several pawls, said pawls being in the form of springy fingers comprised by a longitudinally slit sleeve and said row of ratchet teeth is comprised by a row of circumferentially extending serrations.

6. An automatic adjuster as claimed in claim 5 in which each said finger has several circumferentially extending serrations thereon complementary to said serrations comprising said row of ratchet teeth.

7. An automatic adjuster as claimed in claim 5 in which said circumferentially extending serrations comprise a fine-pitch buttress-type screw thread.

8. An automatic adjuster as claimed in claim 7 in which said serrations comprising said row of ratchet teeth are circumferentially interrupted at longitudinally aligned locations so that, by angularly displacing said longitudinally slit sleeve relative to said row of ratchet teeth, said pawls can be disengaged for re-setting said ratchet mechanism.

9. An automatic adjuster as claimed in claim 5 in which said piston has a rod extending therefrom inside said sleeve and having thereon said circumferentially extending serrations comprising said row of ratchet teeth and in which said thrust member is hollow and has an internal conical surface thereon by which it normally engages complementary surfaces adjacent the distal ends of said fingers for inwardly urging the fingers positively into engagement with said serrations.

10. An automatic adjuster as claimed in claim 1 in which said hydraulic actuator includes a body member having a through bore and said counter-member of the hydraulic actuator comprises a second piston opposed to the first-mentioned piston, both said pistons being slidable in said bore through said body member.

References Cited

UNITED STATES PATENTS 2,568,858   9/1951   Kovac _____ 188—72 X
3,365,029   1/1968   Swift _____ 188—73

DUANE A. REGER, *Primary Examiner.*